(12) United States Patent
Schlosser et al.

(10) Patent No.: US 9,564,060 B2
(45) Date of Patent: Feb. 7, 2017

(54) GRIPPING AID

(71) Applicants: Anthony Schlosser, Baldwin, NY (US); Donald Schiavetta, III, Bethpage, NY (US)

(72) Inventors: Anthony Schlosser, Baldwin, NY (US); Donald Schiavetta, III, Bethpage, NY (US)

( * ) Notice: Subject to any disclaimer, the term of this patent is extended or adjusted under 35 U.S.C. 154(b) by 196 days.

(21) Appl. No.: 14/336,487

(22) Filed: Jul. 21, 2014

(65) Prior Publication Data

US 2016/0019809 A1    Jan. 21, 2016

(51) Int. Cl.
*G09B 11/02* (2006.01)
*B43K 23/004* (2006.01)

(52) U.S. Cl.
CPC ............. *G09B 11/02* (2013.01); *B43K 23/004* (2013.01)

(58) Field of Classification Search
USPC .......... 434/162, 166, 247, 258; 15/443, 444; 224/218, 219, 221; 446/226
See application file for complete search history.

(56) References Cited

U.S. PATENT DOCUMENTS

| | | | | |
|---|---|---|---|---|
| 940,744 A * | 11/1909 | Smith | ............... | G09B 11/02 401/6 |
| 1,136,450 A * | 4/1915 | Urase | ............... | G09B 11/02 248/118.5 |
| 1,797,103 A * | 3/1931 | Rustad | ............... | B43K 23/001 401/8 |
| 2,501,552 A * | 3/1950 | Thompson | ............... | B43L 15/00 401/8 |
| 2,866,440 A * | 12/1958 | Green | ............... | B43L 15/00 15/443 |
| 3,503,546 A * | 3/1970 | Hunt | ............... | B43L 15/00 224/218 |
| 3,942,194 A * | 3/1976 | Winter | ............... | A47G 21/08 224/219 |
| 4,148,424 A * | 4/1979 | Fortenberry | ............... | B43K 23/001 15/443 |
| D271,160 S * | 11/1983 | Sherwin | ............... | 224/221 |
| 4,523,781 A | 6/1985 | Brody | | |
| 4,602,885 A | 7/1986 | Bischoff et al. | | |
| 4,606,484 A * | 8/1986 | Winter | ............... | A46B 5/00 224/218 |
| 4,993,766 A | 2/1991 | Sutherland | | |
| 5,046,381 A | 9/1991 | Mueller | | |
| 5,542,588 A * | 8/1996 | Sison | ............... | B43L 15/00 15/443 |
| 5,553,324 A | 9/1996 | Emerson | | |
| 5,557,805 A | 9/1996 | Emerson | | |
| 5,662,423 A | 9/1997 | Walden | | |
| 5,791,705 A * | 8/1998 | Romero | ............... | A47G 21/08 224/218 |
| 5,853,210 A | 12/1998 | Robinson | | |

(Continued)

OTHER PUBLICATIONS theGrippit.com, "A writing aid for everyone".
www.especialneeds.com, "Writing Aids, Pencils & Grips".

*Primary Examiner* — Kurt Fernstrom
(74) *Attorney, Agent, or Firm* — Dilworth & Barrese, LLP.

(57) ABSTRACT

A gripping aid for hand held implements such as writing implements or eating utensils, which includes a bracelet portion configured and dimensioned to fit around the wrist of a person and a support band adjustably attached to the bracelet portion to provide an adjustably sized loop for engaging the hand held implement.

16 Claims, 3 Drawing Sheets

(56) References Cited

U.S. PATENT DOCUMENTS

| | | | |
|---|---|---|---|
| 6,394,516 B1* | 5/2002 | Zhuravsky | A61F 4/00 224/218 |
| 6,550,068 B1* | 4/2003 | Materon | A41D 19/01594 2/160 |
| 6,553,574 B1* | 4/2003 | Hall, Jr. | A63B 21/065 2/160 |
| 7,128,484 B2 | 10/2006 | Schulken | |
| 7,469,866 B2* | 12/2008 | Thompson | A61F 4/00 128/877 |
| 7,543,725 B2* | 6/2009 | Herzog | A01G 1/125 15/405 |
| 7,686,740 B1* | 3/2010 | Chang | A63B 21/4019 482/105 |
| 8,029,452 B2* | 10/2011 | Kliewer | A61B 8/4281 128/845 |
| 8,146,968 B1* | 4/2012 | Starr | B43K 23/004 294/25 |
| 8,905,810 B2* | 12/2014 | Muccini | A63H 3/003 446/26 |
| 2004/0084489 A1* | 5/2004 | Murphey | A45F 5/00 224/221 |
| 2013/0020367 A1* | 1/2013 | Buckley | A63B 57/353 224/584 |

* cited by examiner

GRIPPING AID

BACKGROUND

1. Field of the Invention

The present invention relates to a gripping aid or gripping training device to teach and enable a person to properly grip a hand held implement.

2. Background of the Art

There are many persons, such as very young children and those suffering from autism, traumatic brain injury, developmental delays or cognitive impairment, or other handicapped persons such as those suffering from physical injuries or medical conditions, who find it difficult to hold an implement, such as a writing implement or eating utensil, in the proper manner.

The ability to write is an integral part of participating in modern society. It is important for performing some of the most basic tasks that a person may encounter in daily life. This is why it is the second form of communication taught after the spoken word. Whether it is simply writing one's name, performing a mathematical equation, or a composing a novel, the ability to transfer thoughts into a form that may be shared and communicated with others is undeniably valuable.

Persons, and in particular young children learning how to write, often grip hand held implements used for writing, drawing and painting improperly. Absent instruction to the contrary, a child will generally grasp a writing implement, such as a pencil, pen or crayon, in a manner that feels the most stable to him or her.

Beginning at age three, and through adulthood, the most stable grasp that still allows precision and proper pencil pressure, is a dynamic "pincer grip", or "tripod grip". To achieve such a grip, the individual pinches the implement between the distal pads of the index finger and thumb, and then rests the implement on the lateral distal interphalangeal joint of the middle finger. These three fingers together form the pincer, or tripod. With this grip, these three fingers, supported by arches in the palm of the hand, can utilize precise movements of rotation, flexion and extension to achieve the small movements needed for letter formation or other fine motor activities requiring accuracy. In addition, the space between the thumb and index finger, namely the web space, must be maintained in an open and circular manner to support the dynamic movements of the pincer fingers. The ulnar side of the hand stays in a flexed and quiet position so as to provide a stable base of support from which the pincer can move.

Many individuals develop improper grasping habits by gravitating towards seemingly more stable grasp patterns at the expense of precision. One of the most difficult struggles with teaching a person how to write is forming the correct grip on the writing implement. A natural tendency of a person, particularly one suffering from a handicap, who is handed an implement, especially a writing implement, such as a crayon, pen or pencil, is to hold it in a four finger or fist shaped grip, also known as a "gorilla grip". Another common improper grasp pattern is the thumb wrap grasp, in which the thumb overlaps the implement. The result when improperly holding a writing implement, is an inactive thumb that pulls in other muscles to compensate, with increased pressure on the writing implement, decreased control of the implement, and increased hand fatigue when writing. Other common improper grasping patterns include hyperextension at the distal interphalangeal joints of the thumb and index finger, which causes increased implement pressure and a tight grasp, resulting in hand fatigue; power grasp in which the implement is held in a fisted manner with the ulnar side of the hand toward the paper, resulting in decreased precision and increased implement pressure; four-finger digital grasp in which all four finger pads touch a writing implement on one side and the thumb pad opposes the fingers on the other side of the writing implement, resulting in decreased control and decreased implement pressure; and internal rotation and adduction of the thumb, resulting in a closed web space, increased implement pressure, increased hand fatigue and poor implement control.

As a result of compensatory grasping patterns, learning how to write properly, legibly, neatly, efficiently, and with enough endurance to complete tasks within a typical time frame, is hindered. Furthermore, efficient use of other hand held implements is impeded. In addition, thumb and finger joints can be subjected to unnecessary stress. These grips make it difficult to perform fine motor movements, which are needed to create alphanumeric shapes. Therefore, gripping a writing implement in the proper writing formation with a "pincer grip", i.e., using the thumb, index and middle fingers to control the utensil in a controlled and exacting fashion, is important.

Given the importance of a proper grip and writing technique to successful writing, numerous attempts have been made over the years to perfect a device to aid in the proper positioning of an individual's fingers upon a writing implement. Gripping aids for such persons to facilitate the grasping of hand held implements are known in the art. For example, U.S. Pat. No. 4,602,885 to Bischoff discloses an implement holding cuff for assisting a person with poor prehensile ability to hold an implement.

U.S. Pat. No. 5,662,423 to Walden is directed to a gripping aid for writing implements and discloses a conical shaped gripping aid which is slidably positioned along the barrel of a writing implement.

U.S. Pat. No. 5,853,210 to Robinson is directed to a pen and instrument holder for physical impaired hands and discloses a glove and a mounting attachment for holding the base of a pen, pencil or other device.

U.S. Pat. No. 7,128,484 to Schulken discloses a gripping aid including arched, oppositely extending thumb wrap-preventing rims.

Generally speaking, these devices have either been for writing aids which provide a "gripping surface" into which the user presses his fingers or writing aids which include a "sleeve" which encase one or more of the digits of the user. However, devices utilizing these approaches have inherent drawbacks which have prevented their general acceptance.

What is yet needed is a device which serves as a training tool to correct the grip of the individual to a proper writing formation, or pincer grip, for holding writing implements or eating utensils while providing adjustability to accommodate various levels of support and different size hands. Prior art devices do not provide such features.

SUMMARY

The gripping aid device of the present invention provides structural support when forming the proper writing grip. Using this device restricts the user to the proper hand position for holding a writing implement or eating utensil. It provides a guide to teach the proper grip and develop muscle memory in the hands and fingers.

This invention is especially useful for teaching children of a young age, or those with handicaps such as autism or other developmental disabilities that may have difficulty with the fine motor control of gripping a writing utensil. The gripping aid device described herein will help train them to develop the correct grip and eventually be able to write with more control. The natural tendency to incorrectly grip the utensil will not be allowed by this device.

Accordingly, what is provided herein is a gripping aid for hand held implements which comprises (a) a bracelet portion configured and dimensioned to extend around the wrist of a person; (b) a support band adjustably attached to the bracelet portion and providing an adjustably sized loop for engaging the hand held implement. Also provided are adjustable means for adjustably connecting the support band to the bracelet portion.

The present invention also includes a method for training a person to properly hold an implement in a hand, the method comprises: (a) providing a gripping aid which includes (i) a bracelet portion configured and dimensioned to extend around the wrist of a person, (ii) a support band adjustably attached to the bracelet portion and providing an adjustably sized loop for engaging the hand held implement, and (iii) means for adjustably connecting the support band to the bracelet portion; (b) placing the bracelet portion of the gripping aid around a wrist of the person; (c) positioning the implement in the hand of the person so that it is properly held in a pincer type grip; and (d) adjusting the connection of the support band to the bracelet portion such that it forms a loop L possessing a distance D between the bracelet portion and the implement wherein the implement is disposed through the loop, the distance D being selected so that the loop L maintains the implement oriented in the pincer type grip.

The method of the present invention can also include readjusting the connection of the support band to the bracelet portion to increase distance D of the loop L if the person has demonstrated increased skill in maintaining the implement in the proper pincer type grip. Additionally, the method of the present invention can include terminating use of the gripping aid upon determining that the person has mastered the habit of maintaining the implement in the proper pincer type grip.

BRIEF DESCRIPTION OF THE DRAWINGS

Various embodiments are described below with reference to the drawings wherein.

DETAILED DESCRIPTION OF PREFERRED EMBODIMENT(S)

The present invention is a gripping aid to help those persons learning how to write, such as young children, and which is especially suitable for use by handicapped persons such as those with autism, traumatic brain injury, developmental delays or cognitive impairment as well as suffering from physical injuries or medical conditions. The gripping aid not only provides support for correct gripping of a hand-held implement, it also functions as a training tool. The gripping aid is adjustable so that as the person using the gripping aid develops proper gripping configuration of the hand, the support provided by the gripping aid can be reduced until the gripping aid is no longer needed.

Figure 1:
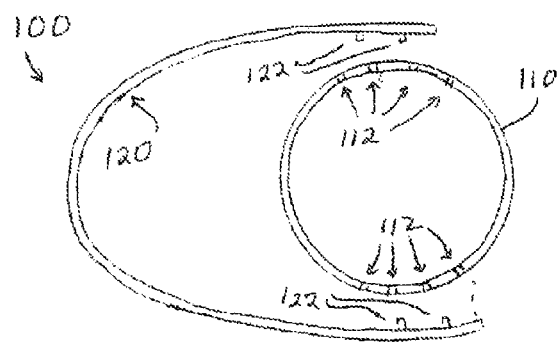
FIG. 1 is a plan view illustrating the gripping aid of the invention with the support band separated from the bracelet portion.
Figure 2:
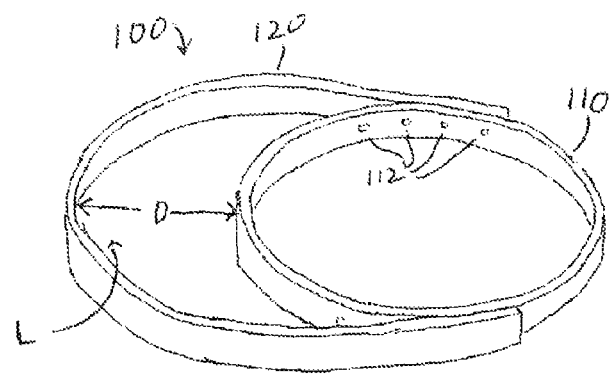
FIG. 2 is a perspective view of the gripping aid of the invention with the support band connected to the bracelet portion.

Referring now to FIGS. 1 and 2 of the drawings, gripping aid 100 includes a bracelet portion 110 and a support band 120. Both the bracelet portion and the support band are fabricated from a flexible material, and optionally also, an elastic material. Preferred materials for constructing the bracelet portion and the support band include plastics fabricated from polymers suitable for use in contact with human skin such as, for example, silicones, polyolefins, polyvinyl chloride, polyvinyl acetate, polyvinyl alcohol, and other suitable polymers. Optionally, the gripping aid 100 can be colored and/or have graphic designs or indicia printed thereon to make the gripping aid 100 more attractive, especially to children. Also, the bracelet portion 110 and/or the support band can be embossed with various patterns or graphic designs. The bracelet portion 110 and support band 120 are preferably in the form of flat strips having a width of from about ⅛ inch to about ¾ inch, and preferably from about ¼ inch to about ½ inch, and a thickness of from about 1/16 inch to about 3/16 inch.

The bracelet portion 110 is an annular band configured and dimensioned to fit around the wrist of a human and defines a circumferential length. At least two apertures 112 are included at least on each of two diametrically opposite portions of the bracelet portion. More preferably, a plurality of apertures 112 is disposed on each of the two diametrically opposite portions of the bracelet portion or around the entire bracelet. The apertures are longitudinally spaced apart from each other and are configured in a lengthwise array. The spacing between the apertures 112 can be uniform or varied. The apertures 112 extend through the thickness of the bracelet portion and are configured and dimensioned to receive the pegs 122 of the support band 120, as discussed below.

The support band 120 is an elongated strip having two opposite ends. In the vicinity of each end at least one peg 122 extends laterally from the same side of the support band. Preferably, at least two pegs 122 extend laterally in the vicinity of each end of the support band 120 and are positioned in a linear array, the pegs 122 being spaced apart from each other the same distance as the apertures 112 of the bracelet portion. The pegs 122 are configured and dimensioned to releasably engage the apertures 112 and to be frictionally retained therein until deliberately disengaged. While the invention has been described herein with pegs 122 extending from the support band 120 and the apertures 112 in the bracelet portion 110, as an alternative the pegs 122 can extend from the bracelet portion and the apertures 112 can be in the support band 120.

Figure 5:
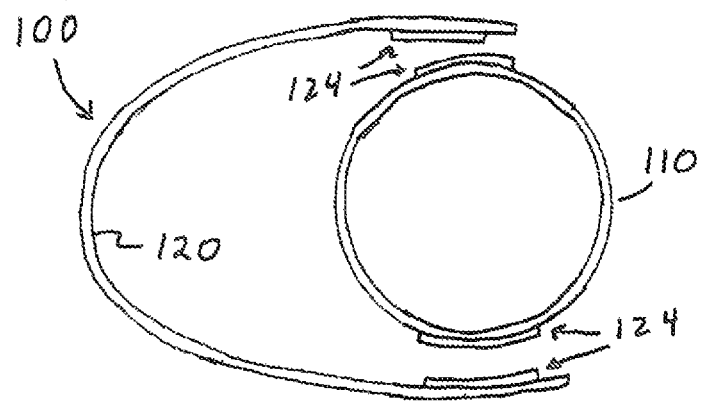
FIG. 5 illustrates an alternative embodiment of the gripping aid of the invention; and, FIG. 6 illustrates another alternative embodiment of the bracelet portion.

The array of apertures 112 and pegs 122 provide a means for adjustably attaching the support band 120 to the bracelet portion 110. However, another means for adjustably attaching the support band 120 to the bracelet portion 110 can be provided by the use of matching hook and loop type fastener strips commonly known as Velcro® type fasteners. For example, referring now to FIG. 5, gripping aid 100 comprises a support band 120 and bracelet portion 110 wherein matching hook and loop type fastener strips 124 are attached on the inner surface of the support band 120 and the facing outer surface of the bracelet portion 110 in mating relationship. The matching hook and loop type fastener strips 124 are releasably connected to each other at any of various positions such that the support band 120 and bracelet portion can be adjustably connected.

Figure 3:
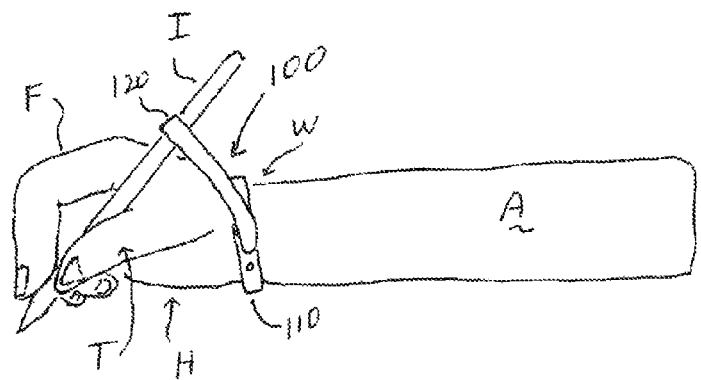
FIG. 3 is an elevational view showing the gripping aid of the invention in conjunction with the hand of a person.

In operation, the bracelet portion of the gripping aid is placed around the wrist of the person using the gripping aid and the writing implement or eating utensil is properly positioned in the hand of the person. When attached to the bracelet portion 110, the support band 120 forms a loop L which engages the writing implement I (FIG. 3). The loop extends a distance D which can be adjusted to accommodate the size of the hand of the person using the gripping aid 100. Also, when the gripping aid 100 is being used as a training aid, in the initial stage of training the support band 120 is connected to the bracelet portion 110 such that distance D is adjusted to provide tighter engagement of loop L with the writing implement I. This initial configuration gives greater support to the person using the gripping aid 100 and helps the person form a habit of properly gripping the implement. As the person becomes more and more proficient at properly gripping the implement, the loop L can be loosened by readjusting the connection between the support band 120 and the bracelet portion 110 to increase the distance D. Finally, use of the gripping aid 100 can be altogether terminated when the person has successfully acquired the habit of properly gripping the implement.

Referring now to FIG. 3, use of the gripping aid 100 is illustrated. FIG. 3 shows the arm A, wrist W and hand H of a person. The bracelet portion 110 of the gripping aid 100 is disposed around the wrist W of the person who is holding a writing implement I. The support band 120 engages the writing implement I held by the hand H and positions the implement I such that it is held in a pincer grip between the thumb T, and the forefinger F of the person's hand H in a proper orientation.

Figure 4:
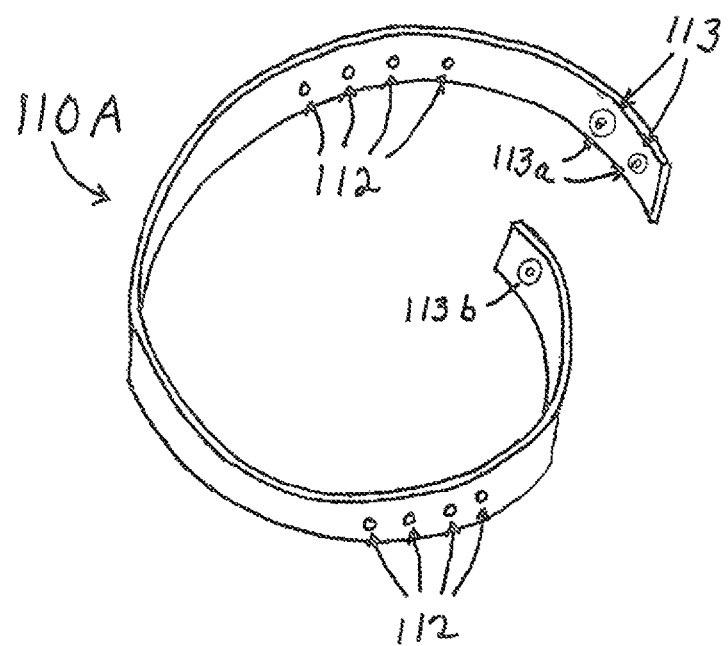
FIG. 4 illustrates an alternative embodiment of the bracelet portion.

Referring now to FIG. 4, in another embodiment of gripping aid 100 the bracelet portion is adjustable. For example, bracelet portion 110A is a linear strip having apertures 112 to receive pegs 122 as described above. However, bracelet portion 110A has two opposite ends with means to adjustably connect the ends to provide the bracelet portion 110A with an adjustable circumference. In an embodiment the bracelet portion 110A includes one or more longitudinally spaced snap fasteners 113 in the vicinity of the ends. In particular, as shown in FIG. 4 bracelet portion 110A has two or more male, or stud, portions 113a of the snap fastener 113 in longitudinally spaced apart relation along the length of the bracelet portion 110A in the vicinity of one end. A female, or socket, portion 113b of snap fastener 113 is positioned in the vicinity of the opposite other end of the bracelet portion so as to be snap fit engageable with one of the male portions 113a. The user can adjust the circumference of the bracelet portion by selecting the male portion 113a to be engaged with the female portion 113b. Thus, the bracelet portion 110A can be adjusted to properly fit the wrist size of the user. Alternatively, the bracelet portion 110A can have a single male portion 113a and two or more longitudinally spaced female portions 113b with the female portion 113b being selected for engagement with the male portion to provide the appropriately sized bracelet portion 110A. The snap fasteners 113 can be disengaged and an alternative male portion 113a (or female portion 113b) can be selected to change the circumference of the bracelet portion 110 OA. For example, the bracelet portion 110 OA can be initially configured for a smaller wrist and thereafter reconfigured for a larger wrist, or vice versa. Also, instead of snap fasteners 113, pegs such as pegs 122 can be substituted for the male portions 113a, and apertures such as apertures 112 can be substituted in the bracelet portion 110A for the female portion 113b.

Figure 6:
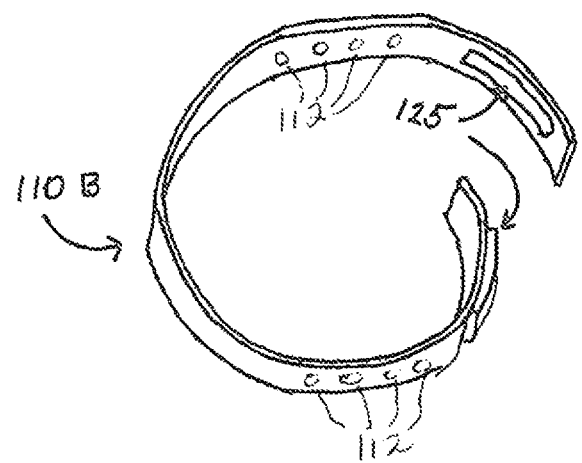

In yet another embodiment as shown in FIG. 6, instead of snap fasteners 113, the bracelet portion 110B can include hook and loop type fastener strips 125 in the vicinity of the ends of the bracelet portion strip on respective facing surfaces in mating relationship so as to provide another means for adjustably connecting the ends of the bracelet portion 110B. The matching hook and loop type fastener strips 125 are releasably connected to each other at any of various positions to provide for a desired circumference of the bracelet portion 110B. Bracelet portion 110B can also include apertures 112 (as shown), or hook and loop type fastener strips 124 for adjustable connection to the support band 120 as described above in connection with FIG. 5.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A gripping aid for a hand held implement, which comprises:
   a bracelet portion configured and dimensioned to extend around the wrist of a person;
   a support band including a first band end and a second band end opposite the first band end, the support band being adjustably attached to the bracelet portion and providing an adjustably sized loop for engaging the hand held implement, the support band comprising:
   a first band portion at or adjacent to the first band end; and
   a second band portion at or adjacent to the second band end,
   wherein the first band portion is directly and adjustably attached to a surface of the bracelet portion at a first location, and the second band portion is directly and adjustably attached to the surface of the bracelet portion at a second location that is different from the first location.

2. The gripping aid of claim 1 further comprising means for adjustably connecting the support band to bracelet portion.

3. The gripping aid of claim 1 wherein the first location of the bracelet portion includes a plurality of apertures and the first band portion includes a plurality of pegs, said pegs being configured and dimensioned to frictionally engage the respective apertures in the first location of the bracelet portion.

4. The gripping aid of claim 3 wherein the apertures are spaced apart from each other and are arranged in a linear array along a length of the bracelet portion and the pegs are spaced apart from each other and are arranged in a linear array along a length of the support band.

5. The gripping aid of claim 1 wherein the bracelet portion and the support band are each individually fabricated from a synthetic polymer selected from the group consisting of silicones, polyolefins, polyvinyl chloride, polyvinyl acetate, polyvinyl alcohol and combinations thereof.

6. The gripping aid of claim 1 wherein the bracelet portion and the support band are each fabricated in the form of a flat strip.

7. The gripping aid of claim 6 wherein the bracelet portion and the support band each independently have a width of from ⅛ inch to about ¼ inch, and a thickness of from about 1/16 inch to about 3/16 inch.

8. The gripping aid of claim 1 wherein the bracelet portion and/or the support band are colored.

9. The gripping aid of claim 1 wherein the bracelet portion and/or the support band have graphic design(s) or indicia printed thereon.

10. The gripping aid of claim 1 wherein the bracelet portion and/or the support band are embossed with pattern(s) or graphic design(s).

11. The gripping aid of claim 1 wherein the first location of the bracelet portion and the first band portion comprises matching hook and loop type fastener strips attached to adjacent surfaces of each other.

12. A method for training a person to properly hold an implement in a hand, the method comprising the steps:
   providing a gripping aid which includes
      i) a bracelet portion configured and dimensioned to fit around the wrist of a person,
      ii) a support band adjustably attached to the bracelet portion and providing an adjustably sized loop for engaging the hand held implement,
         wherein a first band portion is directly and adjustably attached to a surface of the bracelet portion at a first location, and a second band portion is directly and adjustably attached to the surface of the bracelet portion at a second location that is different from the first location;
   placing the bracelet portion of the gripping aid around a wrist of the person;
   positioning the implement in the hand of the person so that it the implement is properly held in a pincer type grip; and
   adjusting the connection of the support band to the bracelet portion such that the support band forms a loop L possessing a distance D between the bracelet portion and the implement wherein the implement is disposed through the loop, said distance D being selected so that the loop L maintains the implement oriented in the pincer type grip.

13. The method of claim 12 further comprising the step:
   readjusting the connection of the support band to the bracelet portion to increase distance D of the loop L upon determining that the person has demonstrated increased skill in maintaining the implement in the proper pincer type grip.

14. The method of claim 13 further comprising the steps:
   terminating use of the gripping aid upon determining that the person has mastered the habit of maintaining the implement in the proper pincer type grip.

15. The method of claim 12 wherein the first location of the bracelet portion includes a plurality of apertures and the first band portion includes a plurality of pegs, said pegs being configured and dimensioned to frictionally engage respective apertures in the bracelet portion, wherein the apertures are spaced apart from each other and are arranged in a linear array along a length of the bracelet portion and the pegs are spaced apart from each other and are arranged in a linear array along a length of the support band and the step (d) of adjusting the connection of the support band to the bracelet portion comprises inserting the pegs of the support band into the respective apertures of the bracelet portion to provide a loop L with the desired distance D.

16. The method of claim 12 wherein the implement is a writing implement.

* * * * *